United States Patent [19]
Kostov et al.

[11] Patent Number: 5,808,383
[45] Date of Patent: Sep. 15, 1998

[54] STEP LINEAR ELECTROSTATIC MOTOR

[75] Inventors: Edward Kostov; Vinceslao Dyatlov; Piero Perlo, all of Orbassano, Italy

[73] Assignee: C.R.F. Societa Consortile per Azioni, Torino, Italy

[21] Appl. No.: 951,468

[22] Filed: Oct. 16, 1997

[30] Foreign Application Priority Data

Oct. 17, 1996 [IT] Italy .................................. T096A0847

[51] Int. Cl.⁶ .................................................. H02K 41/00
[52] U.S. Cl. .......................... 310/12; 310/308; 310/309; 310/112
[58] Field of Search ..................................... 310/308, 309, 310/12, 22, 40 MM, 112; 318/135

[56]  References Cited

U.S. PATENT DOCUMENTS

| | | | |
|---|---|---|---|
| 2,975,307 | 3/1961 | Schroeder et al. .................... | 310/12 |
| 4,689,520 | 8/1987 | Higuichi .................................. | 318/135 |
| 4,922,143 | 5/1990 | Gosdowski et al. ................... | 310/12 |
| 5,235,225 | 8/1993 | Colgate et al. ....................... | 310/12 |
| 5,534,740 | 7/1996 | Higuichi et al. ....................... | 310/309 |
| 5,552,654 | 9/1996 | Konno et al. ......................... | 310/309 |
| 5,585,683 | 12/1996 | Higuichi et al. ...................... | 310/309 |

*Primary Examiner*—Thomas M. Dougherty
*Assistant Examiner*—Tran N. Nguyen
*Attorney, Agent, or Firm*—Sughrue, Mion, Zinn, Macpeak & Seas, PLLC

[57]  ABSTRACT

A linear electrostatic motor comprises a planar stator having a capacitive structure formed by a metal layer and a layer of dielectric material and a movable member having first and second groups of feet formed by a conductive thin film and arranged in rolling contact on the layer of dielectric material of the stator. In operation, the voltage pulses applied to the feet of one of the two groups have a shift, for example substantially of one half of a period, with respect to the voltage pulses applied to the other group of feet.

6 Claims, 2 Drawing Sheets

STEP LINEAR ELECTROSTATIC MOTOR

BACKGROUND OF THE INVENTION

The present invention relates in general to electrostatic motors having low power and small dimension and adapted for use as actuators in applications of microelectronics technology for actuating mechanical devices and the like in conditions of shock loads and vibrations, such as in the automotive field.

For such applications there have been proposed piezoelectrical-type electrostatic motors-actuators, in which the conversion of electromechanical energy is based on the reversed piezoelectric effect. These motors have various drawbacks, among which a relatively high cost of manufacture and a low reliability, they require quite high supply voltages and do not have a sufficiently high efficiency. As a result, the use of these piezoelectric motors is not satisfactory usually for the applications mentioned at the beginning, particularly on board motor-vehicles.

Step linear electrostatic motors are known which comprise a planar stator having a capacitive structure formed by a metal layer and a layer of dielectric material, and a movable member parallel and spaced apart from the stator and having conductive thin film means defining resiliently deflectable projecting feet arranged in contact with the layer of dielectric material of the stator, and means for supplying voltage pulses in order to apply an electric field between said feet and said metal layer of the stator so as to resiliently deform said feet by electrostatic effect causing a translation force on said movable member along a direction parallel to the stator.

The peculiar characteristics of the conversion of the electromechanical energy on which the operation of these motors is based lies in that when the feet of the movable member roll along the stator a concentration of extremely high energy takes place at the feet-layer of the electric material interface, having a force equivalent to a pressure in the order of 100–150 kg/cm$^2$ and consequently the force which moves the movable member linearly with respect to the stator reaches values up to 10N. The efficiency of this energy conversion is much greater than that of piezoelectric motors and reaches values in the order of 90%.

The drawbacks of the motors of this type which are presently known are due to that as a result of the displacement of the movable member relative to the stator, i.e. following the application of voltage pulses to the electrodes formed by the feet of the movable member on one side and the metal layer of the stator on the other side, the interruption of the rolling movement of the feet generates a condition of unstable balance between the movable member and the stator, due to the inertia forces. Furthermore, at the beginning of the following stage in which the feet return by resilience to the starting condition, some delay takes place due to the presence of adhesion forces and residual electrical charges in the layer of dielectric material of the stator. This drawbacks decrease the capability of the motor to stand shocks and vibrations, and also decrease the speed of displacement of the movable member, which causes a limit to the efficiency and reliability of the motor.

SUMMARY OF THE INVENTION

The object of the present invention is that of overcoming the said drawbacks, providing an electrostatic motor of the above defined type having an increased shock and vibration resistance so as to ensure a greater efficiency and a higher reliability.

According to the invention, this object is achieved essentially due to that the linear electrostatic motor according to the invention comprises first and second groups of feet as well as due to that said supply means are provided for causing a shift, for example of one half of a period, between the voltage pulses respectively applied to the first and second feet groups.

In this manner, during the cycle of operation of the motor when electric potential is applied between the first feet group of the movable member and the metal layer of the stator, there is no potential between the second feet group and this metal layer. As a result of this, the feet of the first group act as electrostatic fastening members to insure structural stability of the stator and movable member in case of shocks and vibrations. When potential is applied between the second feet group of the movable member and the metal layer of the stator, a partial rolling of these feet on the layer of dielectric material takes place by electrostatic effect. As a result, also the feet of the second group begin to work as electrostatic fastening members. Then, when the potential between the first feet group and the metal layer of the stator is removed, a further rolling of the feet of the second group takes place by electrostatic effect and the movable member is moved relative to the stator of one step having a corresponding amplitude. Practically, during the movement of the movable member the first group and the second group alternate with each other in performing the function of electrostatic fastening members.

In the electrostatic motor-actuator according to the present invention, the use of a plurality of feet (or "petals" or "cilia") enables a very rapid electrostatic capture effect to be obtained, which insures a very high reliability of operation which practically is not affected by vibrations, planarity defects of the stator, presence of dust. For this reason, the invention is particularly adapted for application to microelectronic systems installed on board motor-vehicles.

The present invention also provides a method for controlling the step linear motor according to what is specified in the annexed claim 6.

According to a preferred embodiment of the invention, the feet have a cross-section with a substantially S-shaped configuration.

Furthermore, respective screening metal layers are advantageously interposed between the first and second group feet and the movable member.

BRIEF DESCRIPTION OF THE DRAWINGS

The invention will be now described in detail with reference to the annexed drawings, given purely by way of non limiting example, in which.

BRIEF DESCRIPTION OF THE INVENTION

Figure 1:
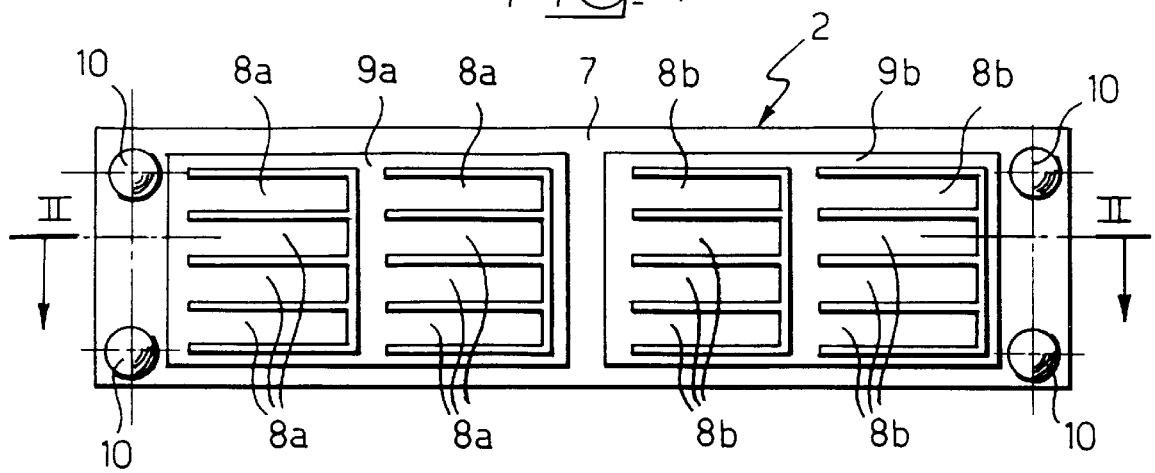
FIG. 1 is a diagrammatic plan view from below of the movable member of a linear electrostatic motor according to the invention.
Figure 2:
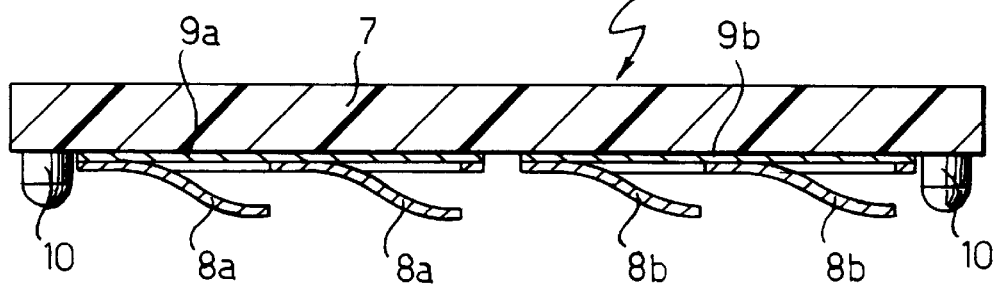
FIG. 2 is a longitudinal view partially in a cross section taken along line II—II of FIG. 1.
Figure 3:
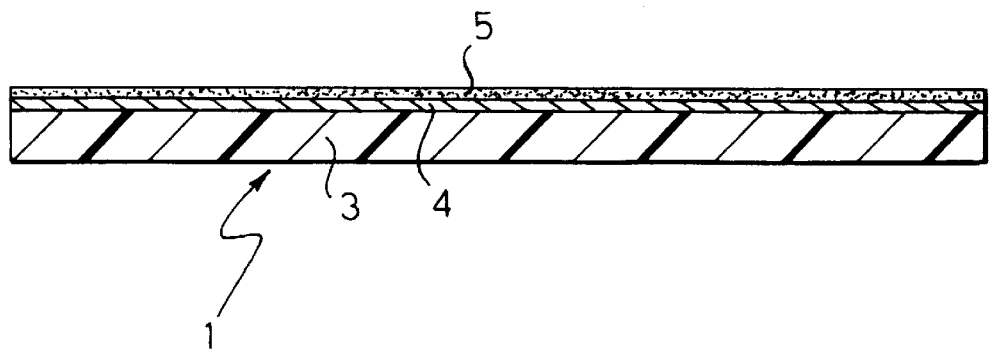
FIG. 3 is a longitudinal view partially in cross section of the stator of the linear electrostatic motor.

Referring initially to FIGS. 1 through 3, the essential components of the linear electrostatic motor according to the invention include a stationary member or stator 1 and a movable member 2. It is to be noted that, for sake of simplicity, the drawings show only the elementary structure of these components, omitting details of construction which are not essential for understanding the invention.

The stator 1 is constituted by a base 3, for example in form of a thin quadriangular plate of electrically insulating material, with its inner face having a capacitive structure formed by a metal layer 4 and a planar layer of dielectric material 5. Preferably, this dielectric material has a non linear polarization with respect to an applied electrical field, and is advantageously formed by a film of ferroelectric material, such as neobate-strontium. As diagrammatically indicated in FIG. 4, the metal layer 4 of stator 1 is electrically connected to an electric supplying source 6 for generating voltage pulses.

The movable member 2 comprises a supporting plate 7 of insulating material, having a shape substantially similar to that of base 3 of stator 1, from whose lower face there project two separate and adjacent groups of feet (or "petals" or "cilia") 8a, 8b which are resilienty deflectable and project towards stator 1.

Feet 8a, 8b are formed by a thin film of conductive material and in the undeformed condition shown in FIG. 1 they have a generally S-shape configuration with flexes having a high curvature radius.

At one end, the feet 8a, 8b of each of the two groups are fixed to a respective screening metal plate 9a, 9b which on its turn is fixed permanently to support 7.

By 10 there are designated two pairs of sliding members projecting from the opposite ends of the movable member 2 and arranged in sliding contact on the cooperating areas of the layer of dielectric material 5 of stator 1.

Figure 4:
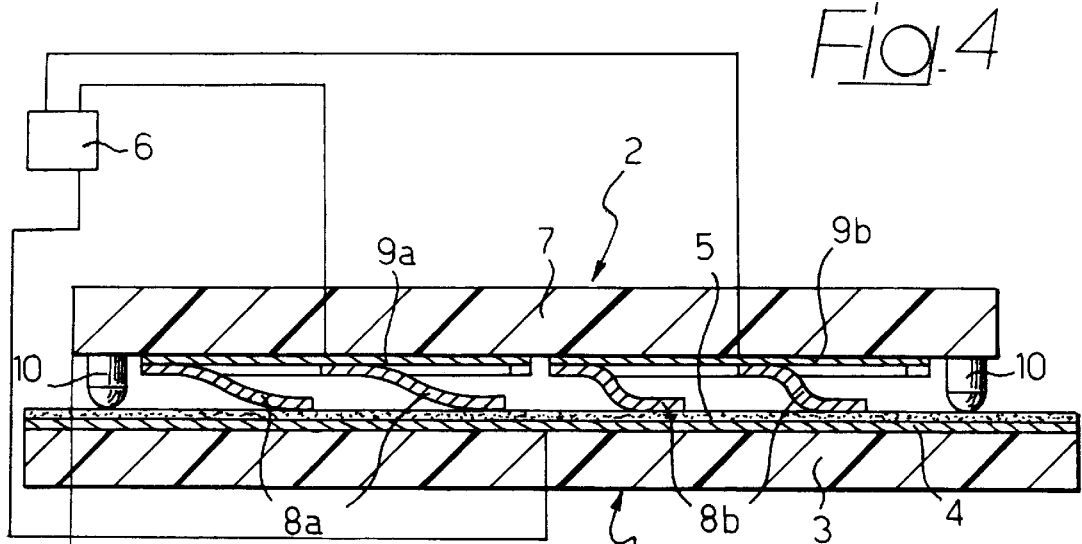
FIG. 4 is a longitudinal view partially in cross section which generally shows the linear electrostatic engine in a first stage of operation.

Each group of feet 8a, 8b is independently connected to supplying source 6, in the way diagrammatically shown in FIG. 4, usually through the respective metal plate 9a, 9b.

In the mounted condition of the linear electrostatic motor according to the invention, the movable member 2 is superimposed on stator 1, parallel to the latter, with the sliding members 10 in contact with the layer of dielectric material 5. The free ends of the two groups of feet 8a, 8b are in simple electric contact with the electric 5.

The supplying source 6 is provided for supplying voltage pulses to the electrodes constituted by the metal layer 4 of stator 1 and the feet 8a of the movable member 2 on one side and the metal layer 4 and feet 8b on the other side, with a shift, for example, of one half of a period with respect to the total period of one step. In other words, the presence of an electrical field at the feet 8a corresponds to the absence of the electrical field at feet 8b, and vice versa.

In the following, the stages which are necessary for causing the movable member of the linear electrostatic motor to move of one step parallel to its stator will be described.

Figure 5:
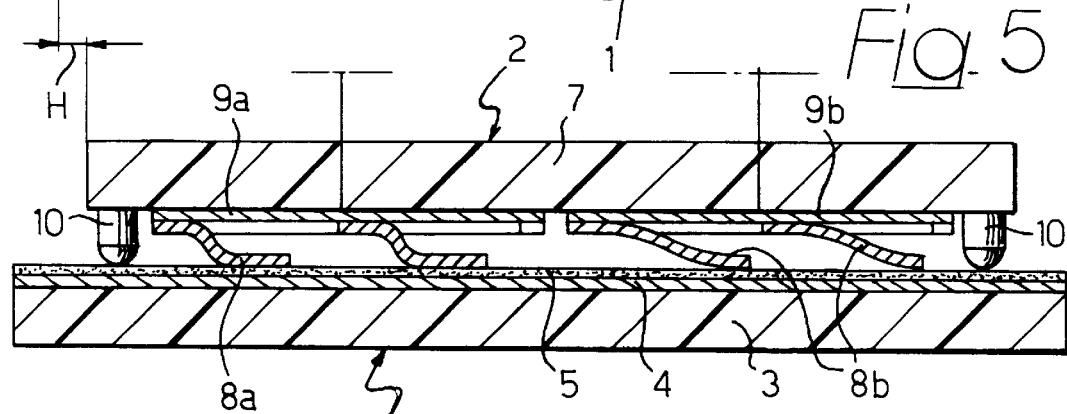
FIG. 5 is a view similar to that of FIG. 4 with shows a second stage of operation.

FIGS. 4 and 5 show two sequential stages which correspond totally to one step of the movable member with respect to the stator during the operation of the linear electrostatic motor according to the invention.

Figure 6:
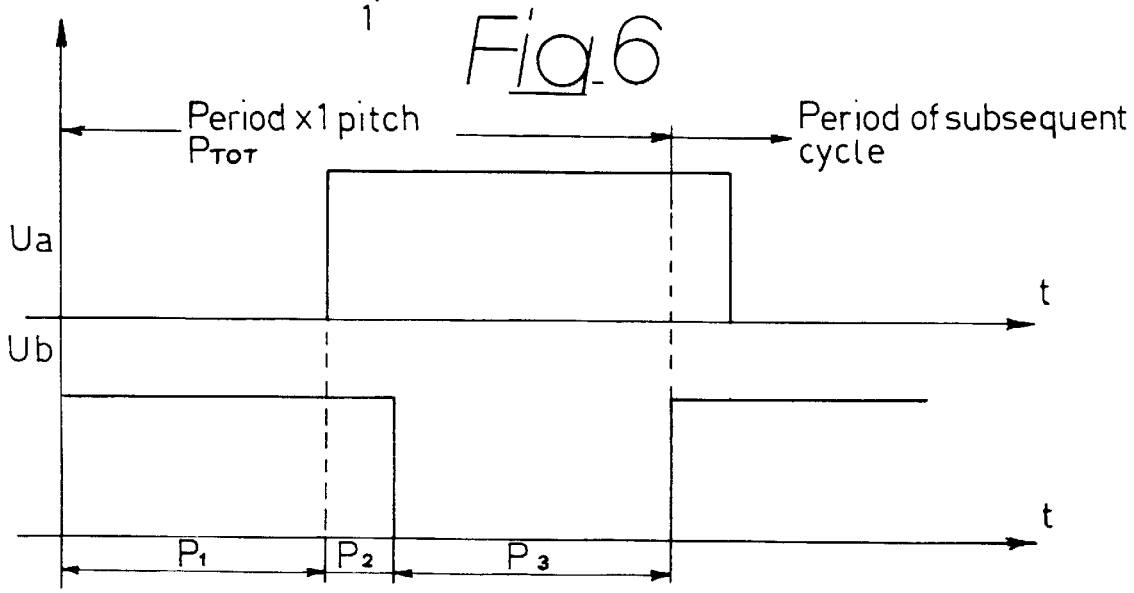
FIG. 6 is a diagram showing variation of the electric potential with the time during operation of the motor.

With reference to FIG. 6, which shows the composition of a complete cycle of the voltage pulses with the time, time periods P1, P2, P3 can be seen, which form the total time period $P_{tot}$ of the cycle.

During the stage of period P1, with reference to FIGS. 4, 6, the electric potential generated by the supplying source 6 is applied between feet 8b and the metal layer 4 of stator 1, no electrical potential being applied between feet 8a and the metal layer 4. In this condition, feet 8b act as electrostatic fastening members and insure the structural stability of the whole unit stator-movable member with respect to shock and vibrations.

The stage of period P2 is an intermediate stage in which the electrical potential generated by the supply 6 is applied also between feet 8a and the metal layer 4. In this condition the feet 8a, under the fact of the applied electrical field, begin to deform from the rest S-shape with high curvature radius (as shown in FIG. 4) to a S-shape with small curvature radius (as shown in FIG. 5) and also the electrostatic fastening forces between the metal layer 4 and feet 8a increase. In the final stage of this period P2, the feet 8a are not yet completely deformed, but there exists an electrostatic adhesion force between feet 8a and metal layer 4 sufficient to insure the structural rigidity desired for the whole stator-movable member unit, with respect to shocks and vibrations.

In the final stage P3, with reference to FIGS. 5 and 6, the electric potential applied to feet 8b is removed, so that these feet loose the electrostatic adhesion with respect to the metal layer 4 and are therefore free to slide on the latter; at the same time feet 8a continue to deform due to the electric potential previously applied and thus cause movement of the movable member parallel to the stator, by a distance H rightwardly (with respect to FIGS. 4 and 5). At the end of their deformation, feet 8a, due to the electric potential applied thereto, adhere by electrostatic effect to the metal layer 4 given the required structural rigidity.

During the whole cycle the electrostatic fastening forces between stator and movable member are always present. This may be repeated periodically importing a longitudinal translation movement to the movable member relative to the stator and parallel thereto.

In practice, during the displacement of the movable member the groups of feet 8a, 8b always act as electrostatic fastening members. Under the action of inertia forces only pitch H may vary: therefore the influence of shocks and vibrations on the electrostatic motor according to the invention is dramatically reduced.

During the time interval between the pulses, i.e. in the absence of voltage generated by the supplying source 6, the feet 8a or 8b not subjected to the electrical field are subjected not only to the elastic return force which tends to unfold them. Indeed, in the case in which the operation of dielectric material is not perfect, these feet may also be subjected to high electrostatic adhesion forces, due to the residual electrical charges in the layer of dielectric material 5. These forces would tend to render the feet unfolding stage longer. However, in the embodiment according to the invention, the electrical field supplied to the feet which act as fastening members 8a or 8b (as a function of the period of the cycle which is being considered) is removed when the powering feet, respectively 8b or 8a, which will became fastening feet in the immediately subsequent stage, are still under deformation, so that the powering feet are capable to displace the movable member and the fastening feet therewith which are still partially adhering to the dielectric 5, thus facilitating the unfolding of the fastening feet and the discharge of the residual electrostatic charge (in the dielectric portion underline said fastening feet) so as to decrease the system reaction time. This provide a considerable improvement in the efficiency and the reliability motor.

The variation with the time of potential $U_a$, $U_b$ respectively applied to feet of group 8a and group 8b is shown respectively in the upper and lower parts of FIG. 6.

Naturally, the details of construction and the embodiments may widely vary with respect to what has been described and illustrated, without departing from the scope of the present invention, as defined in the following claims.

We claim:

1. Linear electrostatic motor, comprising a planar stator having a capacitive structure formed by a metal layer and a layer of dielectric material, and a movable member parallel and spaced apart with respect to the stator and having conductive thin film means defining resiliently deflectable projecting feet arranged in contact with the layer of dielectric material of the stator, and means for supplying voltage pulses in order to apply an electrical field between said feet and said metal layer of the stator so as to resiliently deform said feet by electrostatic effect and cause a translation force on the movable member along a direction parallel to the stator, wherein said motor comprises first and second groups of said feet and wherein said supplying means are provided for causing a shift in the voltage pulses respectively applied to the first and second groups of feet.

2. Electrostatic motor according to claim 1, wherein the voltage pulses respectively applied to the first and second groups of feet have a shift of about one half a period therebetween.

3. Electrostatic motor according to claim 1, wherein said feet have a cross section with a substantially S-shaped configuration.

4. Electrostatic motor according to claim 1, wherein between the feet of said first and second groups and the movable member there are interposed respective screening metal elements.

5. Electrostatic motor according to claim 1, wherein said layer of dielectric material of the stator is a film of ferroelectric material.

6. Method for controlling a linear electrostatic motor comprising a planar stator having a capacitive structure formed by a metal layer and a layer of dielectric material, and a movable member parallel to and spaced apart from the stator and having conductive thin film means defining resiliently deflectable projecting feet arranged in contact with the layer of dielectric material of the stator, and means for supplying voltage pulses to apply an electrical field between said feet and said metal layer of the stator so as to resiliently deform said feet by electrostatic effect and cause a translation force on the movable member along a direction parallel to the stator, wherein first and second groups of said feet are provided and wherein said first and second groups of said feet are supplied with voltage pulses having periods with a shift therebetween.

* * * * *